(12) United States Patent
Smith

(10) Patent No.: US 12,484,133 B1
(45) Date of Patent: Nov. 25, 2025

(54) INDUSTRIAL LIGHTING DEVICE

(71) Applicant: Functional Devices, Inc., Sharpsville, IN (US)

(72) Inventor: Noah Daniel Smith, Carmel, IN (US)

(73) Assignee: Functional Devices, Inc., Sharpsville, IN (US)

( * ) Notice: Subject to any disclaimer, the term of this patent is extended or adjusted under 35 U.S.C. 154(b) by 23 days.

(21) Appl. No.: 18/775,269

(22) Filed: Jul. 17, 2024

(51) Int. Cl.
*H05B 47/25* (2020.01)
*H05B 45/14* (2020.01)
*H05B 45/31* (2020.01)
*H05B 47/17* (2020.01)

(52) U.S. Cl.
CPC ............. *H05B 47/25* (2020.01); *H05B 45/14* (2020.01); *H05B 45/31* (2020.01); *H05B 47/17* (2020.01)

(58) Field of Classification Search
CPC ........ H05B 47/24–28; H05B 45/50–56; H05B 47/185; H05B 45/31–315; H05B 47/25; H05B 45/14; H05B 47/17
See application file for complete search history.

(56) References Cited

U.S. PATENT DOCUMENTS

| | | | |
|---|---|---|---|
| 2014/0285089 A1* | 9/2014 | Akahoshi | H05B 47/25 323/284 |
| 2018/0359835 A1* | 12/2018 | Moorthy | H02M 1/081 |
| 2021/0345463 A1* | 11/2021 | Perrin, III | H05B 45/325 |

* cited by examiner

*Primary Examiner* — Renan Luque
(74) *Attorney, Agent, or Firm* — ICE MILLER LLP

(57) ABSTRACT

Industrial lighting control system and methods provide for real-time overcurrent protection and phase-cut dimming capabilities. Embodiments include a system comprising a power input, a computing device, switches, and a control interface. The computing device processes control signals to generate phase-cut dimming signals, supports both leading edge and trailing edge dimming modes, and monitors current draw in real time to prevent overcurrent conditions. A user interface allows for setting and adjusting a low dim threshold to ensure stable performance at minimal brightness levels. The system is compatible with both current sink and current source controllers, automatically adjusting its operation accordingly. This improvement provides efficient, precise dimming control, enhancing the safety, reliability, and versatility of industrial and commercial lighting applications.

20 Claims, 6 Drawing Sheets

INDUSTRIAL LIGHTING DEVICE

BACKGROUND

Phase-cut dimming has been employed in industrial and commercial lighting control due to its ability to efficiently adjust the brightness of various lighting fixtures. Traditional dimming methods often involve reducing the voltage supplied to the lights, which can lead to inefficiencies and poor performance, especially with modern lighting technologies like LEDs. This conventional approach typically results in less precise control and can cause flickering or inconsistent light output, which is undesirable in professional settings.

In phase-cut dimming, a portion of the AC waveform is chopped to decrease the power delivered to the lighting fixture. There are two primary types of phase-cut dimming: leading edge and trailing edge. Leading edge dimming cuts the front part of the AC waveform, while trailing edge dimming cuts the back part. Each method has its own set of advantages and drawbacks, depending on the type of load being controlled. For instance, leading edge dimmers are often used with incandescent and halogen lights, whereas trailing edge dimmers are preferred for electronic low voltage transformers and LED lights due to their smoother operation and reduced likelihood of causing light flicker.

A significant challenge in phase-cut dimming systems is the management of overcurrent conditions. switches or TRIACs used as switches in these dimmers can overheat if the lights draw more power than these components are rated to handle. Overheating not only risks damaging the dimmer itself but also poses a potential fire hazard. Traditional methods of overcurrent protection typically involve hardware solutions such as fuses, circuit breakers, or thermocouples to monitor the temperature or current flow through the switches. These solutions, while effective to some extent, have limitations in their response times and accuracy. For example, fuses and circuit breakers are often slow to react, which may not be sufficient to prevent damage in rapidly changing conditions.

More sophisticated overcurrent protection methods rely on sampling the current over time and then analyzing this data to identify overcurrent events. This approach can introduce delays in detecting and responding to such events, which is not ideal in scenarios where immediate action is required to prevent damage. The challenge is further compounded by the complexity of accurately detecting peak current in phase-cut waveforms. In phase-cut dimming, the peak current does not occur at a fixed point in the AC cycle but varies depending on whether leading edge or trailing edge dimming is used and the specific duty cycle of the dimming signal.

Another issue in conventional phase-cut dimming systems is ensuring compatibility with various types of loads and control systems. Different lighting technologies, such as incandescent, halogen, and LED lights, have unique characteristics that affect how they respond to phase-cut dimming. Ensuring that a dimmer can effectively and safely control a wide range of lighting loads without causing flicker or inconsistent light output is a persistent challenge. Additionally, phase-cut dimmers must be compatible with different control signals, particularly the widely used 0-10V control standard in building automation systems. This standard requires dimmers to interpret and respond to low-voltage control signals, adding another layer of complexity to the design and implementation of these systems.

Phase-cut dimming applications therefore encounter challenges include ensuring precise and efficient control of light brightness, managing overcurrent conditions to protect dimming components, and maintaining compatibility with various types of lighting loads and control systems. These challenges highlight the need for advanced solutions that can offer real-time overcurrent protection and integration with different control signals, and reliable performance across a range of lighting technologies.

SUMMARY

Embodiments described herein provide efficient and precise dimming control for industrial lighting systems while incorporating advanced safety features, such as real-time overcurrent protection, to enhance the reliability and durability of the lighting system. In some embodiments, the industrial lighting system includes a power input, a computing device, one or more switches, and a control interface, such as a voltage control interface (e.g., a 0-10V control interface). The power input can accept any range of AC voltage inputs. In a non-limiting example, the power input can accept 120-277 Vac, 60 Hz, allowing the system to be used in various industrial and commercial environments. In other examples, the power input can accept 50 Hz, or any other frequency or voltage. In some embodiments, the computing device can be a microcontroller, Field Programmable Gate Array (FPGA), Application-Specific Integrated Circuit (ASIC), Programmable Logic Device (PLD) or any other type of computing device. The computing device interprets a voltage control signal (e.g., a 0-10V voltage control signal) and converts it into appropriate phase-cut signals required for dimming, featuring an improved algorithm for detecting instantaneous peak current draw, which provides real-time overcurrent protection.

For example, the switches, which can include one or more MOSFETs, Bipolar Junction Transistors (BJTs), Insulated Gate Bipolar Transistors (IGBTs), thyristors, Gallium Nitride (GaN) Transistors, Silicon Carbide (SiC) Transistors, relays, Solid State Relays (SSRs), Junction Field-Effect Transistors (JFETs), or any other high-efficiency switches that control power flow to the lighting load based on the computing device's instructions. These switches are monitored for overcurrent conditions, and the system shuts them off immediately if an overcurrent condition is detected, preventing overheating and potential damage. The control interface receives dimming signals from the building automation system and converts them into control inputs for the computing device, enabling integration with various lighting control systems.

The industrial lighting system can automatically detect whether a 0-10V signal from a controller is current sink or current source. In addition, the industrial lighting system can include a switch on the side of the device where a user can manually select between setting the product for use with a trailing edge load or a leading edge load. In some embodiments, the industrial lighting system is compatible with both current sink and current source 0-10V controllers, automatically detecting the type of controller and adjusting its operation accordingly. This feature simplifies installation and enhances the system's versatility. Users can select their preferred dimming mode (leading edge or trailing edge) using an onboard switch, which allows the system to suit different types of lighting loads such as incandescent, halogen, and LED fixtures.

In some embodiments, the industrial lighting system includes an adjustable low dim threshold. Many lighting fixtures, particularly LEDs, can flicker or behave unpredictably at very low dimming levels. The system allows users to set a low dim threshold using a push button, ensuring stable performance even at minimal brightness levels. For example, this threshold can be easily reset to factory defaults if needed, providing flexibility and ease of use.

Embodiments described herein also provide real-time overcurrent protection. The computing device's algorithm monitors the current consumed by the lights and detects the instantaneous peak current draw in real-time, allowing the system to shut off the switches immediately if an overcurrent condition is detected. For example, this capability is effective in phase-cut dimming applications, where the peak current can vary depending on whether leading edge or trailing edge dimming is used and the specific duty cycle of the dimming signal.

In some embodiments, the system operates by converting a low-voltage control signal into a high-voltage, phase-cut dimming signal. The computing device uses precise timing to manage the switches, ensuring they switch at the right moments to create the desired dimming effect. If an overcurrent condition is detected, the algorithm within the computing device identifies the peak current and triggers the switches to shut off, preventing potential damage. For example, this real-time response mechanism is a critical safety feature, ensuring that the system remains secure under varying load conditions.

Embodiments described herein provide a significant advancement in industrial lighting control by combining real-time peak current detection with versatile dimming options and automatic compatibility with different control systems. The improved approach of the industrial lighting system enhances safety and reliability, making it a valuable addition to any building automation system. For example, the combination of advanced real-time overcurrent detection and customizable dimming settings distinguishes this system from other phase-cut dimmers on the market, providing superior protection and performance for industrial and commercial lighting applications.

BRIEF DESCRIPTION OF THE DRAWINGS/FIGURES

DESCRIPTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
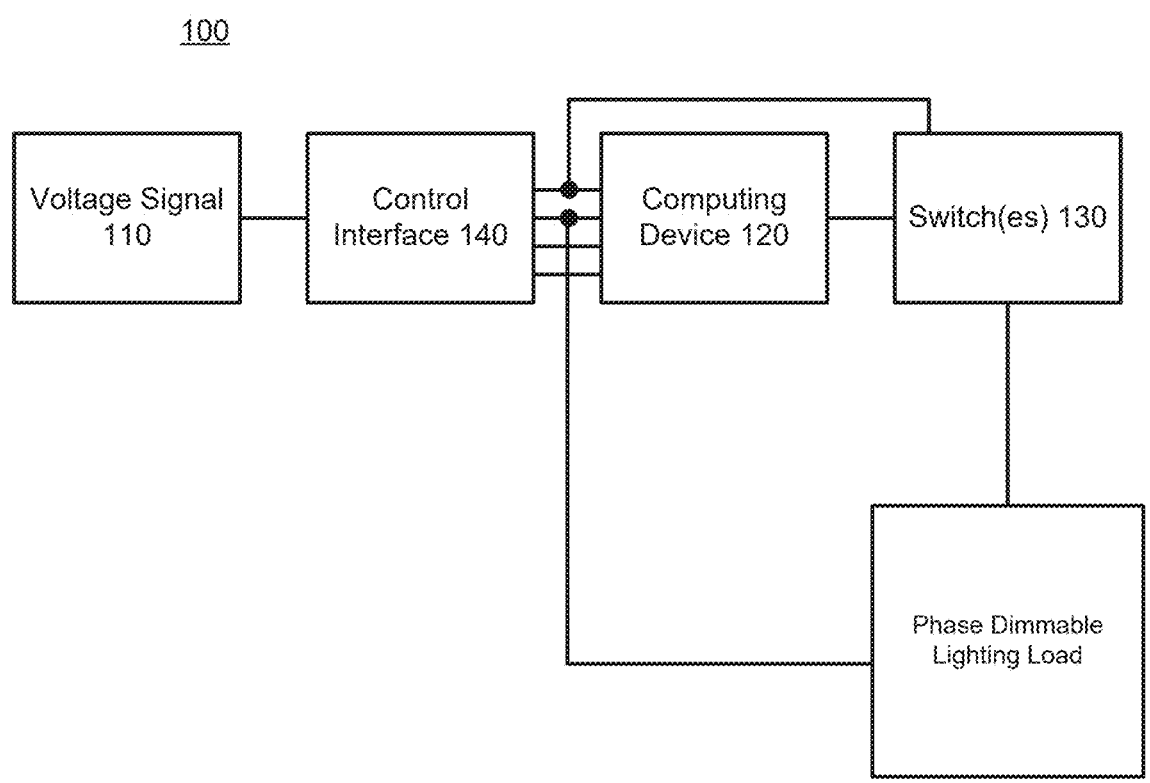
FIG. 1 is an illustration of a system for industrial lighting and building automation systems according to some embodiments.

FIG. 1 illustrates industrial lighting system 100 configured for industrial lighting and building automation systems. industrial lighting system 100 can be defined as or include a phase-cut dimmer. Referring to FIG. 1, industrial lighting system 100 is provided to convert a voltage control signal to a leading/trailing edge (i.e., forward or reverse phase-cut) signal to achieve dimming, for example, in an operating environment of an industrial lighting and/or building automation system. In one non-limiting example, industrial lighting system 100 includes a power input 110, a computing device 120, switches 130, and a control interface 140.

According to some embodiments, power input 110 accommodates a wide range of AC voltage inputs (e.g., 120-277 Vac, 50 Hz or 60 Hz), allowing the industrial lighting system 100 to be employed in diverse industrial and commercial lighting environments. The core of the system, computing device 120, processes the voltage control signal and converts it into precise phase-cut signals required for dimming. A notable feature of computing device 120 is its algorithm for detecting instantaneous peak current draw, which ensures overcurrent protection by determining the peak current draw of both leading and trailing edge signals at any duty cycle in real-time, rather than sampling an entire waveform to identify peaks retroactively.

According to some embodiments, switches 130 can be high-efficiency switches that control power flow to the lighting load based on instructions from computing device 120. switches 130 can be turned on and off at precise intervals, achieving the phase-cut dimming effect. The system monitors these switches for overcurrent conditions and will shut them off if such conditions are detected, preventing potential overheating and damage. The control interface 140 receives dimming signals from the building automation system, converting them into control inputs for computing device 120. These signals range from 0V (indicating the lights should be off) to 10V (indicating full brightness). The interface ensures that computing device 120 adjusts the phase-cut dimming accordingly, facilitating integration with various lighting control systems.

Industrial lighting system 100 is configured to operate by transforming a low-voltage control signal into a high-voltage, phase-cut dimming signal. Computing device 120 can use precise timing to manage the switches 130, ensuring that they switch at a suitable moment to create a desired dimming effect. The industrial lighting system 100 supports both leading edge and trailing edge dimming, which can be selected via an onboard switch. Additionally, the system can automatically detect whether the connected 0-10V controller is a current sink or a current source and adjust its operation to match. This adaptability makes the industrial lighting system 100 versatile in different installation scenarios.

In some embodiments, industrial lighting system 100 is configured to execute an algorithm for detecting instantaneous peak current draw. A challenge is addressed in that MOSFETs used to switch on and off lighting can overheat if the lights draw more current than the MOSFETs are rated for. industrial lighting system 100 executes an algorithm to monitor current being consumed by the lights and to shut off the MOSFETs, e.g., switches 130, to address a safety issue. Traditional methods for overcurrent protection typically involve sampling the entire waveform and retroactively identifying the peak current, which can introduce delays in response time. In contrast, the algorithm used by computing device 120 allows for real-time detection of peak current at the moment it occurs. This provides immediate overcurrent protection, significantly reducing the risk of switches 130 overheating and ensuring reliable operation of the phase-cut dimmer. This approach offers a substantial speed advantage over conventional techniques, enhancing the safety and effectiveness of the dimming system.

Industrial lighting system 100 can be manufactured and encased in an enclosure, for example a NEMA 1 rated enclosure. This ensures durability and compliance with industry standards. To use industrial lighting system 100, the device can be connected to the power input 110, the voltage control signal through interface 140, and the lighting load managed by switches 130. In some embodiments, users can select their preferred dimming mode (leading or trailing edge) using an onboard switch and set the low dim threshold via a push button. Once installed, the system adjusts automatically to the connected control type and begins operation, providing phase-cut dimming while continuously monitoring for overcurrent conditions.

In some embodiments, when industrial lighting system 100 receives a control signal through the control interface 140, computing device 120 processes this signal to determine the appropriate dimming level. It then sends precise timing instructions to switches 130 to switch them on and off, creating the phase-cut signal needed to dim the lights. If an overcurrent condition is detected, the algorithm within computing device 120 instantly identifies the peak current and triggers the switches 130 to shut off, preventing any potential damage. This real-time response mechanism is a critical safety feature, ensuring that the system remains secure under varying load conditions.

Industrial lighting system 100 can also be configured for setting a low dim threshold, which can be adjusted by pressing and holding a push button for one second. This action logs the present 0-10V value and sets the threshold to turn off the load when the signal drops below this value. To reset this threshold to the factory default, users can short together the purple and pink wires or send a 0V signal between them, then press and hold the button again for one second. This flexibility allows for customized dimming levels based on specific requirements, enhancing the usability of the dimmer in different lighting scenarios.

The combination of advanced real-time overcurrent detection and customizable dimming settings makes industrial lighting system 100 an improved solution in the field of industrial lighting control. By leveraging the unique capabilities of computing device 120, the system offers superior protection and performance, distinguishing it from other phase-cut dimmers on the market. The real-time peak current detection algorithm, in particular, provides a significant improvement in safety and efficiency, ensuring that the industrial lighting system 100 can handle demanding lighting environments with ease.

Industrial lighting system 100 provides a versatile and reliable phase-cut dimmer that excels in industrial and commercial applications. It can function efficiently to convert low-voltage control signals into high-voltage phase-cut dimming signals. The unconventional algorithm for real-time peak current detection ensures that the system provides immediate overcurrent protection, enhancing the safety and durability of the lighting setup. With features like selectable dimming modes and adjustable low dim thresholds, industrial lighting system 100 offers a high degree of customization and flexibility, making it ideal for a wide range of lighting control applications.

Figure 2:
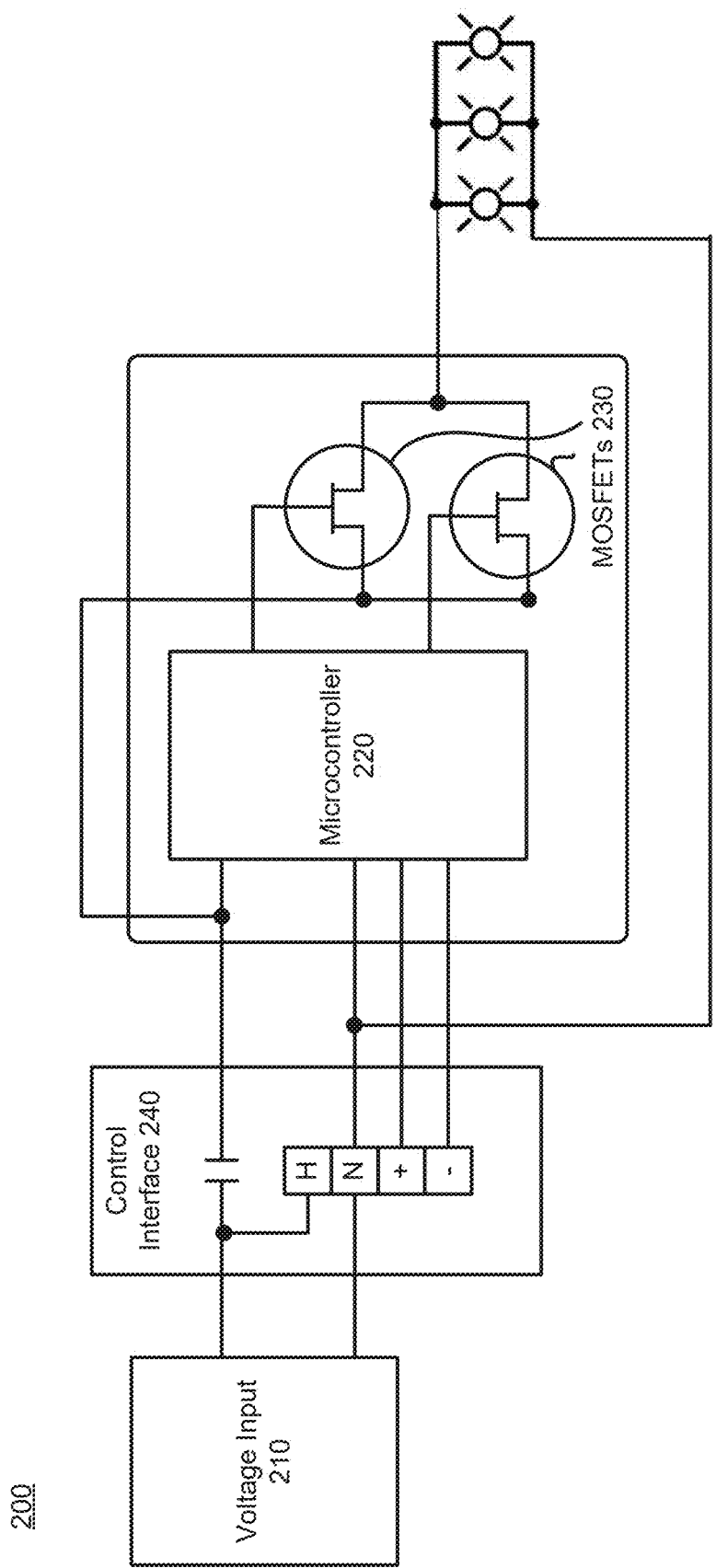
FIG. 2 is an example schematic for industrial lighting and building automation systems according to some embodiments.

FIG. 2 illustrates an arrangement of elements of the industrial lighting system in a system 200 schematic. System 200 includes power input 210, computing device 220, switches 230, and control interface 240. Power input 210 can accept, for example, 120-277 Vac, 50 Hz or 60 Hz, and supplies it to computing device 220, which processes the control signals from control interface 240. Computing device 220 generates phase-cut signals to control switches 230, which in turn modulate the power supplied to the lighting load.

The industrial lighting system in FIG. 2 is configured to efficiently convert low-voltage control signals into high-voltage phase-cut dimming signals. The power input 210 allows the system to accept a wide range of AC voltages, for example, 120-277 Vac at 50 Hz or 60 Hz. This flexibility makes the system suitable for various industrial and commercial applications where different voltage standards may be in use.

Power input 210 connects directly to computing device 220, providing the necessary power for its operation. The computing device 220 is the core processing unit of the system, responsible for interpreting control signals received from the control interface 240. This interface is designed to receive dimming commands from a building automation system or other control devices, which typically operate within the 0-10V range. The control signals range from 0V, indicating that the lights should be turned off, to 10V, indicating full brightness.

Computing device 220 processes these control signals and determines the appropriate phase-cut signal required to achieve the desired dimming level. It features an improved algorithm for detecting instantaneous peak current draw, which enables real-time overcurrent protection. This algorithm allows the computing device to monitor the current being consumed by the lights and detect any conditions that could lead to overheating or damage to the MOSFETs. When an overcurrent condition is detected, the computing device can immediately shut off the switches 230 to prevent any potential damage. It automatically detects the type of controller connected and adjusts its operation accordingly. This automatic detection simplifies installation and ensures that the system can integrate with various lighting control setups. Computing device 220 executes the necessary dimming commands, which are then processed to generate the corresponding phase-cut signals The switches 230 are high-efficiency switches that control the power flow to the lighting load. They receive phase-cut signals from computing device 220, which instructs them when to turn on and off. This switching action effectively chops the AC waveform, reducing the power delivered to the lights and thus dimming them. The precise timing of the switches' switching can achieve smooth and consistent dimming performance, whether using leading edge or trailing edge phase-cut methods.

The control interface 240 is designed to be compatible with both current sink and current source controllers. For example, control interface 240 may be constituted by a dimming switch, a building automation controller sending out a 0-10V signal, or the like. In some embodiments, control interface 240 can be a current sink or a current source.

In practical terms, the operation of system 200 begins with the control interface 240 (for example, a building automation system) transmitting a control signal. This signal is then transmitted to computing device 220, which processes the signal and determines the appropriate phase-cut timing for the switches 230. The computing device's algorithm continuously monitors the current draw to detect any overcurrent conditions. If an overcurrent condition is detected, the computing device can shut off the switches 230 to prevent overheating and potential damage to the MOSFETs.

The phase-cut signals generated by the computing device are sent to the switches 230, which then switch the power to the lighting load on and off at precise intervals. This switching action reduces the power delivered to the lights, thereby dimming them. The system supports both leading edge and trailing edge dimming, allowing users to select the method that best suits their lighting fixtures. Leading edge dimming is typically used with incandescent and halogen lights, while trailing edge dimming is preferred for electronic low voltage transformers and LED lights due to its smoother operation and reduced likelihood of causing light flicker.

The adjustable low dim threshold feature of the system allows users to set a minimum brightness level to prevent flickering or instability at low dimming levels. This is particularly important for LED fixtures, which can behave unpredictably when dimmed too low. The threshold can be set using a push button on the system, and it can be easily reset to factory defaults if needed. This feature ensures that the lighting system performs reliably even at minimal brightness levels.

The specific arrangement of elements of the industrial lighting system 200 is directed to a versatile, reliable, and efficient dimming solution for industrial and commercial environments. Its ability to accept a wide range of input voltages, coupled with the advanced capabilities of the computing device and switches, makes it suitable for a broad range of applications. The system's real-time overcurrent protection algorithm enhances safety by preventing overheating and potential damage to the components.

Thereby, system 200 provides a highly integrated and advanced industrial lighting system that combines flexibility, efficiency, and safety. The power input 210 ensures compatibility with various voltage standards, while the computing device 220, with an efficient and unconventional algorithm, provides precise control and real-time protection. switches 230 effectively modulate power to the lighting load, and with different control systems (e.g., as control interface 240). The adjustable low dim threshold feature adds to the system's reliability, making it a comprehensive solution for modern industrial lighting control needs.

Figure 3:
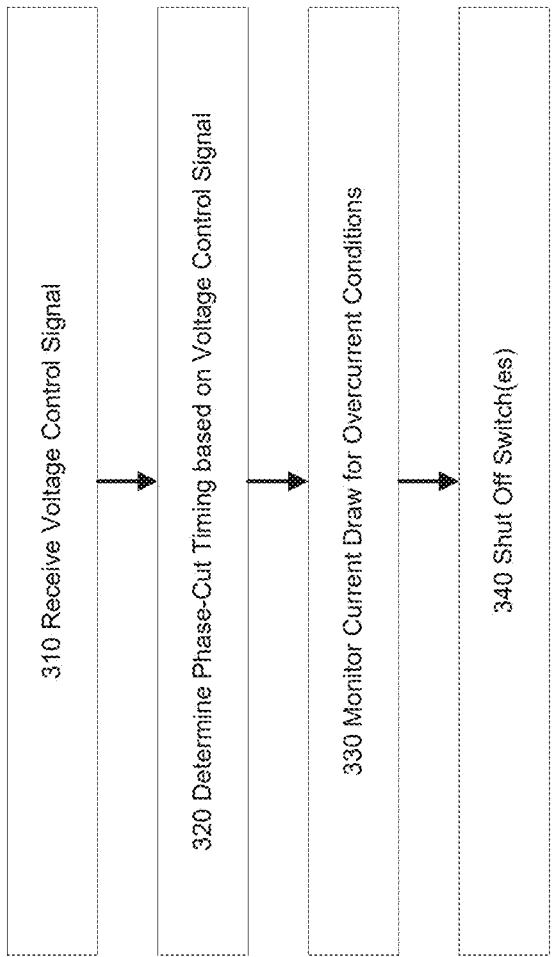
FIG. 3 is a flow diagram of a method for industrial lighting and building automation systems according to some embodiments.

FIG. 3 is a flow diagram of a method 300 for detecting instantaneous peak current draw based on an algorithm executed by computing device 120/220, according to some embodiments of the present disclosure. Based on the disclosure herein, operations in method 100 can be performed in a different order and/or vary.

At operation 310, computing device 120/220 receives the voltage control signal from the dimming controller 240. This voltage control signal is a 0-10V input that indicates the desired dimming level for the lighting system. The computing device 120/220, which includes a microcontroller, interprets this signal as an instruction to adjust the brightness of the connected lighting load.

At operation 320, computing device 120/220 processes the received voltage control signal to determine the appropriate phase-cut timing. This involves calculating the precise moments within the AC cycle when the MOSFETs 230 should be switched on and off to achieve the desired dimming effect. The phase-cut timing is critical for both leading edge and trailing edge dimming operations, ensuring smooth and efficient control of the lighting intensity.

At operation 330, computing device 120/220 continuously monitors the current draw of the lighting load to detect any overcurrent conditions. By analyzing the current flow through the MOSFETs 230, the computing device 120/220 can identify instances where the current exceeds safe operating limits. In the event of an overcurrent condition, the computing device 120/220 is configured to take immediate protective actions, such as shutting off the MOSFETs 230, to prevent damage to the system and ensure safe operation. When an overcurrent condition is detected, at operation 340, computing device 120/220 shuts off switches 130 to prevent overheating and damage.

The computing device 120/220 is the central processing unit of the industrial lighting system, responsible for converting the voltage control signal into phase-cut dimming signals and ensuring the safe operation of the system. Computing device 120/220 receives input from the control interface, which provides dimming commands from a building automation system or other control devices. These commands range from 0V (indicating the lights should be off) to 10V (indicating full brightness).

Upon receiving the control signal, computing device 120/220 processes it to determine the appropriate phase-cut timing. The computing device uses a sophisticated algorithm designed to calculate the exact moments at which the switches 130 should switch on and off. This timing is effective for creating the phase-cut dimming effect, where parts of the AC waveform are chopped to reduce the power delivered to the lighting load, thereby dimming the lights.

A key feature of computing device 120/220 is its real-time overcurrent protection algorithm. This algorithm continuously monitors the current draw of the lighting load to detect any overcurrent conditions. Overcurrent conditions occur when the lighting load draws more current than the system components, particularly the switches 130, are rated to handle. Such conditions can lead to overheating and potential damage if not addressed promptly.

The real-time overcurrent protection algorithm works by analyzing the instantaneous peak current draw. Traditional methods for detecting overcurrent conditions involve sampling the current over an entire waveform and then analyzing this data to identify peaks. However, this approach can introduce delays, making it less effective in preventing damage. In contrast, the algorithm used in computing device 120/220 detects the peak current draw at the exact moment it occurs. This immediate detection allows the system to respond in real-time, shutting off the switches 130 instantly if an overcurrent condition is detected.

Method 300 provides a detailed breakdown of the algorithm's process. Initially, computing device 120/220 receives the voltage control signal from the control interface. It then processes this signal to calculate the phase-cut timing, determining the precise intervals at which the switches 130 should switch on and off. This phase-cut timing is based on the desired dimming level indicated by the control signal.

As computing device 120/220 generates the phase-cut signals, it simultaneously monitors the current draw of the lighting load. The algorithm continuously analyzes the current to detect any instantaneous peaks. If the current draw exceeds a predefined threshold, indicating an overcurrent condition, the algorithm triggers an immediate shutdown of the switches 130. This rapid response helps prevent overheating and potential damage to the system components.

In practical terms, computing device 120/220 manages a delicate balance between maintaining the desired dimming level and ensuring the safety of the system. The phase-cut signals must be timed precisely to achieve smooth and consistent dimming, while real-time monitoring ensures that any anomalies in the current draw are detected and addressed immediately.

Switches 130, controlled by the phase-cut signals from computing device 120/220, act as high-efficiency switches that modulate the power supplied to the lighting load. These switches are effective for implementing the phase-cut dimming process, as their switching action effectively chops the AC waveform. By controlling when the switches turn on and off, the system can reduce the power delivered to the lights, achieving the desired dimming effect.

The improved algorithm within computing device 120/220 is a significant advancement over traditional overcurrent protection methods. By detecting overcurrent conditions in real-time and responding instantly, the system enhances the safety and reliability of the industrial lighting setup. This capability is particularly important in environments where lighting loads can vary and where immediate response to electrical anomalies is critical.

Process flow 300 further illustrates the decision-making process of computing device 120/220. It shows how the algorithm assesses the current draw continuously and compares it against the predefined threshold. If the current remains within safe limits, the computing device continues to generate the phase-cut signals as per the control input. However, if an overcurrent condition is detected, the algorithm overrides the normal operation and shuts down the switches 130 to prevent damage.

Additionally, computing device 120/220 can adapt to different types of dimming, such as leading edge and trailing edge dimming. Leading edge dimming involves switching the switches at the start of the AC waveform, while trailing edge dimming involves switching them at the end. The algorithm can accommodate both methods, adjusting the phase-cut timing accordingly based on the control signal and the type of lighting load.

The real-time monitoring and adaptive capabilities of computing device 120/220 make it a versatile and robust component of the industrial lighting system. Its ability to detect and respond to overcurrent conditions instantaneously ensures that the system can operate safely under varying load conditions. This feature is particularly beneficial in industrial and commercial environments where the lighting setup may be subjected to frequent changes and demands.

Thereby, process flow 300 depicts an advanced functionality of computing device 120/220 in the industrial lighting system. The computing device processes the voltage control signal to generate precise phase-cut dimming signals, while the improved algorithm provides real-time overcurrent protection. By continuously monitoring the current draw and responding instantly to any anomalies, the computing device enhances the safety and reliability of the system. The detailed process flow 300 outlines the algorithm's process, highlighting the computing device's critical role in achieving efficient and safe dimming control. This embodiment showcases the advanced capabilities of the industrial lighting system, making it a valuable solution for modern lighting applications. It should be understood that the operations shown in the exemplary methods are not exhaustive and that other operations can be performed as well before, after, or between any of the illustrated operations. In some embodiments of the present disclosure, the operations can be performed in a different order and/or vary.

Figure 4:
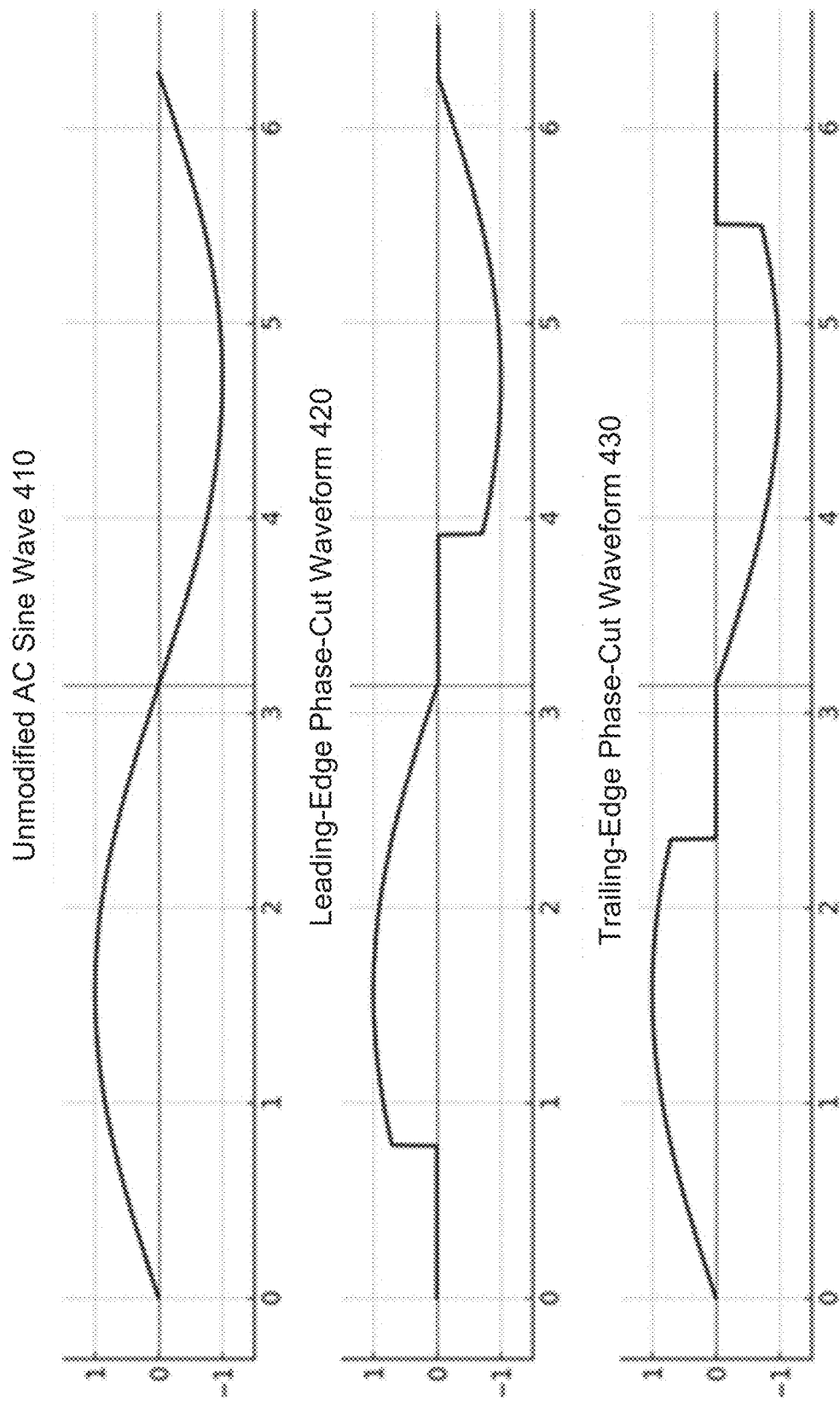
FIG. 4 depicts waveform diagrams for industrial lighting and building automation systems according to some embodiments.

FIG. 4 illustrates the signal diagrams 400 for switches 130/230 operation within the industrial lighting system 100/200. These diagrams show the AC waveform before and after phase-cut dimming, detailing both leading edge and trailing edge dimming processes.

In FIG. 4, the signal diagram for leading edge phase-cut dimming starts with an unmodified AC waveform, represented as a full sine wave. This unaltered sine wave demonstrates the baseline power delivery to the lighting load before any dimming occurs. For leading edge dimming, the switches 130/230 switch off at the beginning of the AC cycle, and on at a designated point partway through the cycle. For example, they may be activated at the zero cross point of the AC cycle, which is the moment when the AC waveform transitions through zero voltage, initiating the cycle. The diagram shows this action by illustrating a chopped-off section at the beginning of the waveform. This cutting action reduces the overall power delivered to the lighting load, resulting in dimming. The precise moments where the switches 130/230 switch on and off are indicated by the rising and falling edges, illustrating how this technique is used with resistive loads such as incandescent and halogen lights. The chopped-off leading edge creates a truncated waveform, indicating reduced power transmission during the initial part of the AC cycle.

For trailing edge phase-cut dimming, the unmodified AC waveform is similarly depicted as a full sine wave. The trailing edge dimming process involves switches 130/230 switching on at the start of the AC cycle and off partway through the cycle. This method effectively cuts the back part of the waveform. The diagram for this process shows the sine wave with the trailing edge removed, indicating the switches' switching action. The points where the switches 130/230 turn off and back on are indicated by the rising and falling edges, illustrating how the trailing edge technique provides a smoother power reduction. This method is particularly suitable for capacitive loads such as electronic low voltage transformers and LED lights, as it can minimize flicker and noise by avoiding abrupt power changes.

The signal diagrams 400 illustrate how phase-cut dimming modifies the AC waveform to achieve dimming effects. By comparing the unmodified sine wave with the altered waveforms after leading edge 420 and trailing edge dimming 430, the diagrams visually represent the impact of MOSFET 130/230 switching on power delivery. This detailed depiction illustrates the effectiveness of phase-cut dimming in controlling lighting intensity.

Figure 5A:
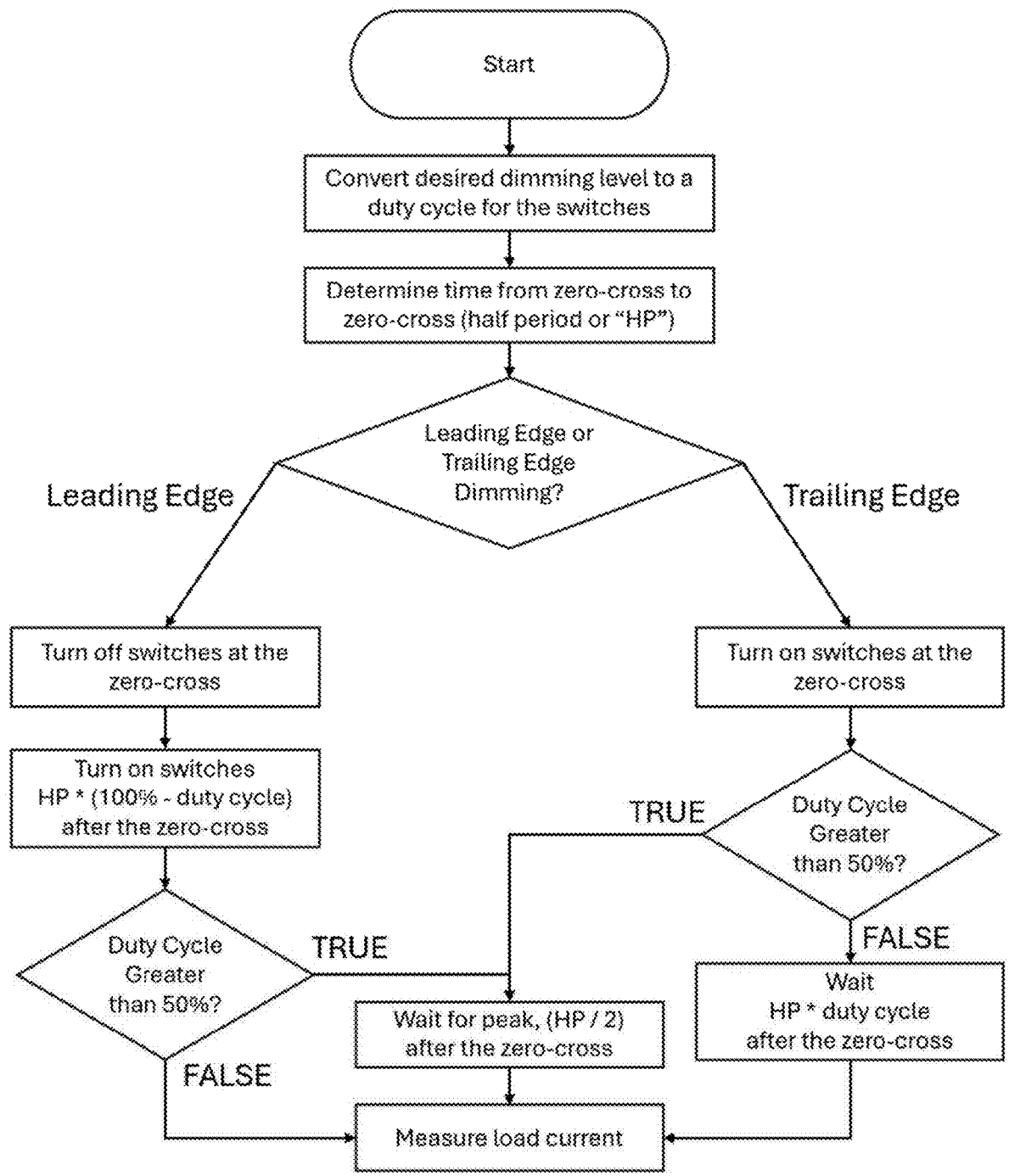
FIG. 5A is a flow diagram for an application of industrial lighting and building automation systems according to some embodiments.

FIG. 5A illustrates method 500 as an exemplary application of an algorithm for controlling dimming and providing real-time overcurrent protection in industrial lighting system 100/200. In a 60 Hz dimming application, for example, method 500 can include controlling the operation of the system based on the selection of leading or trailing edge phase-cut dimming, which is manually set during installation. For leading edge phase-cut dimming, after a switch selection, the MOSFETs are turned off at the zero-cross and activated at a time (e.g., 8.333 ms*(100%−duty cycle)) corresponding to the full period of the sine wave adjusted by the duty cycle. If the dimming level is low, indicated by a Duty Cycle <50%, the load current is measured for overcurrent protection immediately after the MOSFETs are activated. If the dimming level is high, indicated by a Duty Cycle >50%, the load current is measured for overcurrent protection halfway between zero-crosses (e.g. 4.166 ms). Conversely, for trailing edge phase-cut dimming, the MOSFETs are activated at the zero-cross and deactivated at a time (e.g., 8.333 ms*(duty cycle)) corresponding to the full period of the sine wave adjusted by the duty cycle. If the dimming level is low, indicated by a Duty Cycle <50%, the load current is measured for overcurrent protection immediately prior to the MOSFETs turning off. If the dimming level is high, indicated by a Duty Cycle >50%, the load current is measured for overcurrent protection halfway between zero-crosses (e.g. 4.166 ms).

A switch on the physical unit can be provided to change dimming between leading or trailing edge. Operation of the phase-cut dimmer requires a power cycle. A pair of wires may be input from the 0-10V control interface (e.g., purple and pink wire connected to positive and negative terminals of the dimming controller/interface). The purple and pink wires may be used with both Current Sink 0-10V controllers and Current Source 0-10V controllers. The phase-cut dimmer can automatically detect the controller type. A "Low Dim Threshold" can be set with a push button during operation. For example, pressing and holding the button for one second can log, by the microcontroller, a present 0-10V value and turn off the load when 0-10V signal drops below that value. To reset "Low Dim Threshold," short together or send 0V to Purple to Pink. Then press and hold the button for 1 second to set the "Low Dim Threshold" to the minimum value. A factory default "Low Dim Threshold" may be set slightly above this value. Some lighting fixtures flicker at very low values.

Method 500 is configured to detect instantaneous peak current draw of a phase dimmed 120V-277V 50/60 Hz sine wave. It is able to do this at the moment of peak current draw, rather than sampling over the course of one wavelength. This is useful for overcurrent detection as a safety feature to ensure MOSFETs used to switch lighting loads do not overheat.

Figure 5B:
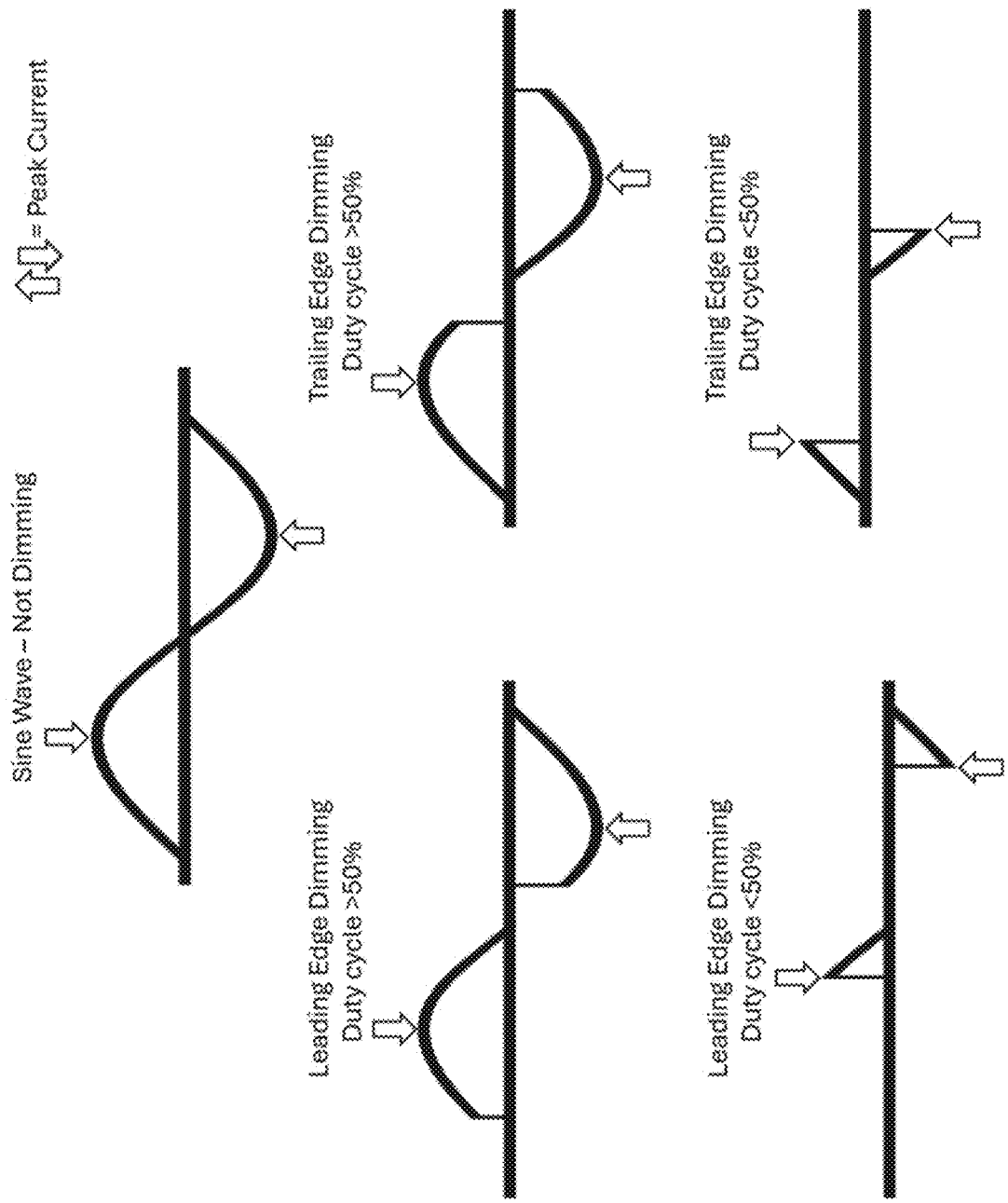
FIG. 5B depicts waveform diagrams for industrial lighting and building automation systems according to some embodiments.

A phase-cut dimmer can be configured to implement method 500, such that the phase-cut dimmer is capable of reading a user's preference for dimming level. The dimmer uses this data to turn on and off MOSFETs at a certain user-input duty cycle. The microcontroller is capable of timing to ensure the MOSFETs are flipped at the exact same time every cycle. The synchronization for this timing can be, for example, the zero-cross of the line voltage sine wave. The above flowchart is suitable, for example, for a 50 or 60 Hz signal and can be adapted to be implemented for any signal FIG. 5B illustrates a signal diagram for leading edge and trailing edge phase-cut dimming in for real-time overcurrent detection, for example, in four different places that peak current may occur depending on if it's leading or lagging, and if dimming level is low or high.

It is to be appreciated that the Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A lighting control system for industrial lighting, comprising:
   a power input configured to accept an AC voltage range from 120-277 Vac, 60 Hz;
   a computing device configured to process control signals and generate phase-cut dimming signals;
   one or more switches configured to switch the power to a lighting load based on the phase-cut dimming signals;
   a control interface configured to receive dimming signals from a building automation system; and
   a memory, coupled to the computing device, configured to store instructions, wherein the instructions, when executed by the computing device, cause the computing device to:
   receive a voltage control signal from the control interface;
   process the control signal to determine phase-cut timing for the switches;
   monitor the current draw of the lighting load to detect real-time overcurrent conditions;
   generate phase-cut dimming signals based on the processed control signal; and
   shut off the switches if an overcurrent condition is detected.

2. The system of claim 1, wherein the computing device is further configured to detect instantaneous peak current draw in real-time and respond immediately to overcurrent conditions to prevent overheating and damage to the switches.

3. The system of claim 1, wherein the control interface is configured to automatically determine whether it is connected to a current sink or current source controller and adjust its operation based on the determination.

4. The system of claim 1, wherein the computing device is further configured to support both leading edge and trailing edge phase-cut dimming modes, enabling a user to select an appropriate mode based on the type of lighting load.

5. The system of claim 1, further comprising a user interface with a push button for setting a low dim threshold, wherein the computing device logs the present 0-10V value when the button is pressed and holds the value to ensure stable performance at minimal brightness levels.

6. The system of claim 1, wherein the computing device is configured to reset the low dim threshold to factory defaults by shorting together specific wires or sending a 0V signal, then pressing and holding the button for a predefined duration.

7. The system of claim 1, wherein the switches are high-efficiency switches selected to handle large current loads with minimal losses, ensuring effective operation under heavy load conditions.

8. A computer-implemented method for controlling industrial lighting, comprising:
  receiving, by a computing device, a voltage control signal from a building automation system;
  processing, by the computing device, the control signal to determine phase-cut timing for switches;
  generating, by the computing device, phase-cut dimming signals based on the processed control signal;
  switching, by the computing device, the switches to modulate power to a lighting load according to the phase-cut dimming signals;
  monitoring, by the computing device, the current draw of the lighting load to detect real-time overcurrent conditions;
  shutting off, by the computing device, the switches if an overcurrent condition is detected.

9. The computer-implemented method of claim 8, further comprising detecting instantaneous peak current draw in real-time and responding immediately to overcurrent conditions to prevent overheating and/or damage to the switches.

10. The computer-implemented method of claim 8, further comprising automatically determine whether the voltage control signal is from a current sink or current source controller and adjusting operation based on the determination.

11. The computer-implemented method of claim 8, further comprising supporting both leading edge and trailing edge phase-cut dimming modes and enabling a user to select an appropriate mode based on the type of lighting load.

12. The computer-implemented method of claim 8, further comprising setting a low dim threshold using a push button interface, logging the present 0-10V value when the button is pressed, and ensuring stable performance at minimal brightness levels.

13. The computer-implemented method of claim 8, further comprising resetting the low dim threshold to factory defaults by shorting together specific wires or sending a 0V signal, then pressing and holding the button for a predefined duration.

14. The computer-implemented method of claim 8, further comprising selecting high-efficiency switches capable of handling large current loads with minimal losses, ensuring effective operation under heavy load conditions.

15. A phase dimmer comprising:
  a power input configured to accept an AC voltage range from 120-277 Vac, 60 Hz;
  a computing device configured to process control signals and generate phase-cut dimming signals;
  one or more switches configured to switch the power to a lighting load based on the phase-cut dimming signals;
  a control interface configured to receive dimming signals from a building automation system;
  a user interface with a push button for setting a low dim threshold;
  a memory coupled to the computing device, wherein the memory stores instructions that, when executed by the computing device, cause the computing device to:
  receive a voltage control signal from the control interface;
  process the control signal to determine phase-cut timing for the switches;
  monitor the current draw of the lighting load to detect real-time overcurrent conditions;
  generate phase-cut dimming signals based on the processed control signal; and
  shut off the switches if an overcurrent condition is detected.

16. The phase dimmer of claim 15, wherein the computing device is further configured to detect instantaneous peak current draw in real-time and respond immediately to overcurrent conditions to prevent overheating and damage to the switches.

17. The phase dimmer of claim 15, wherein the control interface is configured to automatically determine whether it is connected to a current sink or current source controller and adjust its operation based on the determination.

18. The phase dimmer of claim 15, wherein the computing device is further configured to support both leading edge and trailing edge phase-cut dimming modes, enabling a user to select the appropriate mode based on the type of lighting load.

19. The phase dimmer of claim 15, further comprising setting a low dim threshold using a push button interface, logging the present 0-10V value when the button is pressed, and ensuring stable performance at minimal brightness levels.

20. The phase dimmer of claim 15, wherein the computing device is configured to reset the low dim threshold to factory defaults by shorting together specific wires or sending a 0V signal, then pressing and holding the button for a predefined duration.

* * * * *